W. H. & E. E. PEARSON.
INSECT TRAP.
APPLICATION FILED NOV. 9, 1914.
1,239,302.
Patented Sept. 4, 1917.
2 SHEETS—SHEET 1.
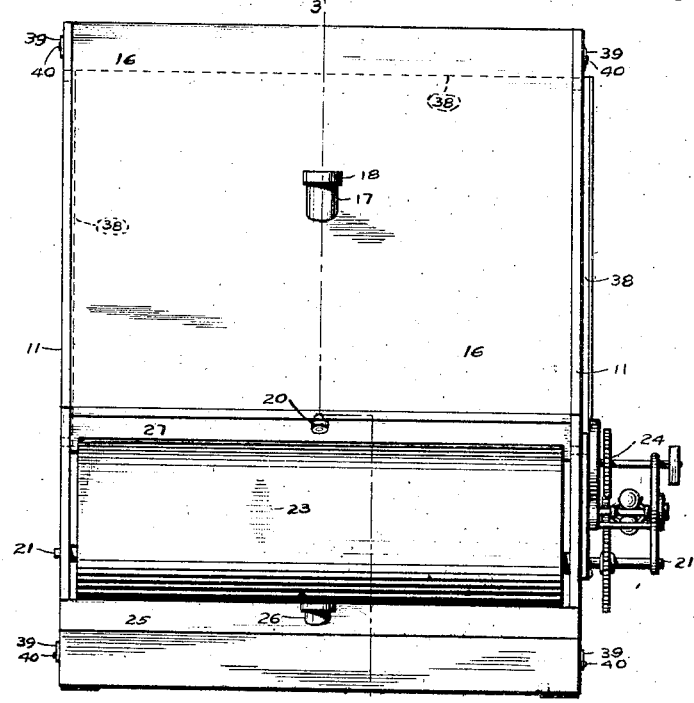
Fig. I.
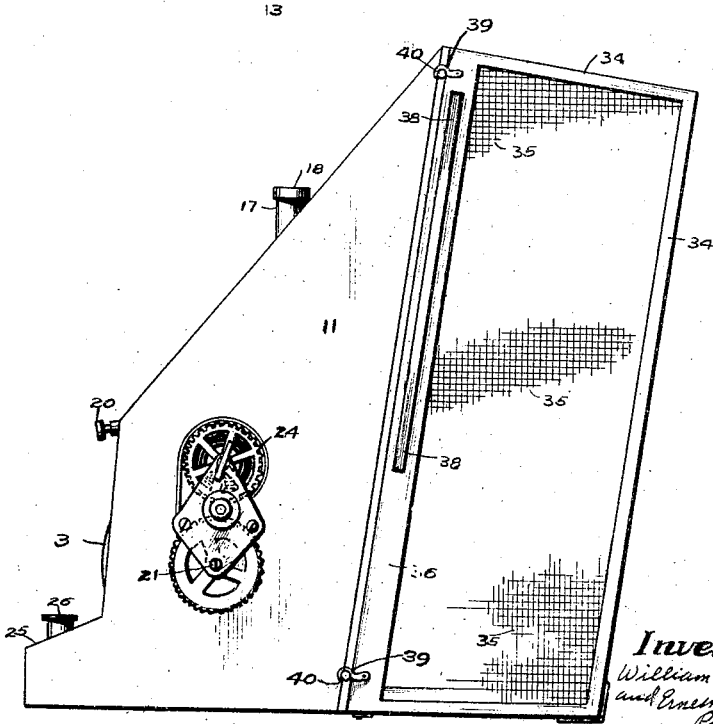
Fig. II.
Witnesses.
Inventors
William H. Pearson
and Ernest E. Pearson
BY Imrig & Bair
Attorneys

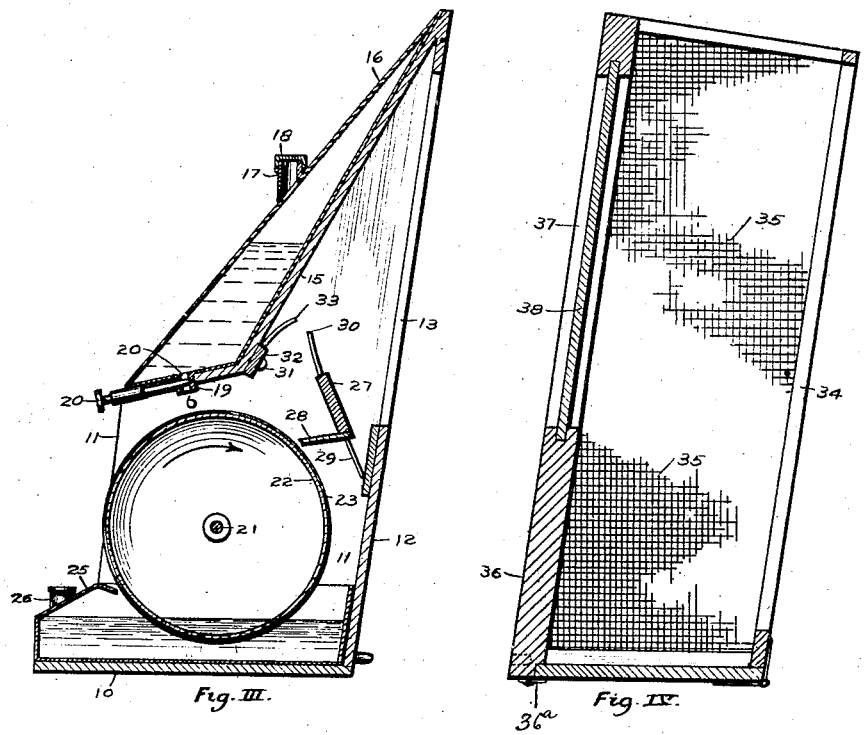
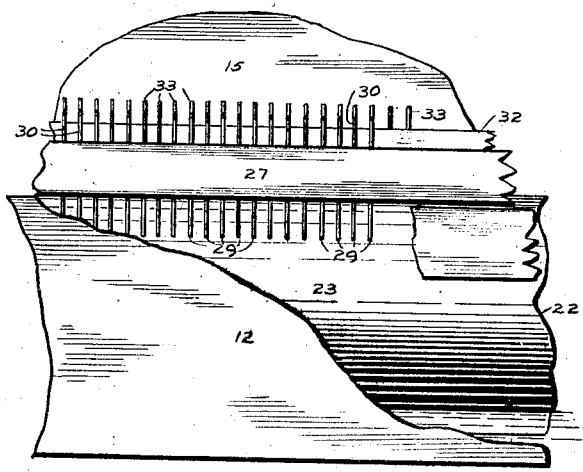

UNITED STATES PATENT OFFICE.

ERNEST E. PEARSON AND WILLIAM H. PEARSON, OF MITCHELLVILLE, IOWA.

INSECT-TRAP.

1,239,302.

Specification of Letters Patent.

Patented Sept. 4, 1917.

Application filed November 9, 1914. Serial No. 871,204.

*To all whom it may concern:*

Be it known that we, ERNEST E. and WILLIAM H. PEARSON, citizens of the United States, residing at Mitchellville, in the county of Polk and State of Iowa, have invented a new and useful Insect-Trap, of which the following is a specification.

Our invention relates to insect traps of the type adapted to employ a moving member for carrying the insects from outside a trap to the inside thereof.

The object of our invention is to provide an insect trap of simple, durable and inexpensive construction, of the type employing a movable member adapted to receive bait of a suitable kind, and to carry flies or other insects toward the interior of the trap.

A further object is to provide such a trap adapted to be used whether for flies or for insects which it is desired to transfer from place to place.

Our invention consists in the construction, arrangement and combination of the various parts of the device, whereby the objects contemplated are attained, as hereinafter more fully set forth, pointed out in our claims and illustrated in the accompanying drawings, in which:

Figure 1 shows a front elevation of an insect trap embodying our invention.

Fig. 2 shows a side elevation of the same.

Fig. 3 shows a vertical, sectional view taken on the line 3—3 of Fig. 1.

Fig. 4 shows a vertical, sectional view through the removable part of the trap, and Fig. 5 shows a detail view of a part of the interior of the trap, illustrating the wires which prevent egress from the trap.

In the exemplification of our invention as set forth in the accompanying drawings, we have used the reference numeral 10 to indicate generally the bottom of that portion of our trap which contains the operative mechanism, and which has the sides 11. The back member 12 connects the side members 11 and the bottom 10, and is provided near its upper portion with a large opening 13. The trap portion now being described is provided with an inclined top member 15 extending from the rear upper portion of the trap downwardly and forwardly, as shown in Fig. 1.

Mounted above the top 15 may be a bait tank 16 having a supply passage 17 on which is a cap 18. Extending downwardly from the bottom of the tank 16 is a tube 19 extended through the opening in the top of the trap. Suitably mounted on the bottom of the tank 15 is a valve 20, whereby the flow of bait from the tank 16 may be regulated as desired.

Mounted in the lower portion of the trap is a transverse shaft 21, on which is a roller 22, preferably covered with some absorbent material 23 such as felt or the like, which can be readily removed when desired. The front of the trap adjacent to the roller 22 is open, as shown in Figs. 1 and 3. The roller or drum 22 may be operated by a suitable mechanism 24, such as a spring controlled clock work, or other source of power.

Received within the trap, the lower portion thereof below the drum or roller 22 is a receptacle 25 for bait, having a supply passage 26.

Mounted within the trap is a transverse frame member 27, shown in Fig. 3, which is spaced above and rearwardly from the roller 22. Connected with the lower edge of the member 27 is a forwardly extending member 28, the forward edge of which is quite close to the roller 22. Extending downwardly and rearwardly from the lower edge of the transverse member 27 is a plurality of spaced wires 29, adapted to permit the passage of light, but to prevent the passage of insects. The wires 29 extend to the rear wall of the trap.

Extending upwardly and forwardly from the member 27 is a plurality of wires 30.

Detachably mounted on the inner surface of the member 15 by means of screws 31, is a frame member 32, in which is mounted a plurality of rearwardly and upwardly extending spaced wires 33, the upper ends of which are slightly spaced from the upper ends of the wires 30. Between the wires 30 and 33 is a space through which flies may pass from the lower forward to the upper rearward part of the trap.

Detachably mounted on the rear of the trap just described is a receiving trap member having the same members 34 and the screen walls 35. The front wall 36 of the receiving trap is solid, with the exception that it has an opening 37 near its upper portion, which registers with the opening 13. The front frame member 36 is provided with suitable slots to admit a sliding door 38 for closing the opening 37 when desired. The receiving trap member is detachably mounted on the first described trap member by means of suitable fastening devices such as the pivoted hooks 39 which are adapted to be secured to fastening members 40 on the first described trap member.

The bottom of the receiving trap is hinged and provided with a catch device 36ª, so that flies or other insects may be easily removed.

Our improved trap is adapted for a large variety of uses. For instance, it may be used as an ordinary fly trap. The clock work is wound up and the parts are so geared that the drum 22 moves very slowly. The material 23 on the surface of the drum may be baited from the bait in the receptacle 25 in which the lower portion of the drum may travel, or by bait from the bait tank 16, as may be desired.

The clock work is wound up, and the drum is started to rotate in the direction indicated by the arrow in Fig. 3. The insects on the drum at the front part of the device are slowly carried upwardly and toward the rear part of the trap to the member 28, where they are scraped off. Attention is particularly called to the fact that the walls of the front portion of the trap, and the frame members 27 and 28 are opaque, so that when the insects are scraped off the rotating member, by means of the member 28, the lightest path offered is that upwardly between the wires 30 and 33. Almost all insects will naturally fly upwardly toward the light, and the insect thereby passes between the wires 30 and 33 into the back upper portions of the trap and thence into the receiving trap. Ordinarily the insects will not fly back between the members 30 and 33.

It should be noted that we do not confine ourselves to the use of a rotating drum, such as that shown in the drawing. Any rotating member adapted to carry the insects from the outside of the trap into the trap would serve our purpose, and come within the purpose and scope of our invention.

Our trap is especially useful for taking bees from a hive and removing them to another hive for starting new swarms. When the device is used for this purpose, and the bees are in the receiving trap member, the sliding member 38 can be moved into position and the screen covered trap carried to any place where it may be desired to release the bees.

Attention is particularly called to the fact that the walls of the front portion of the trap are opaque, so that insects which are carried toward the rear of the front portion of the trap see the light coming from the screen.

It will be understood that numerous changes may be made in the construction of our improved trap without departing from its essential features, and it is our intent to cover by this application any such changes which may be included within the scope of our claims.

We claim as our invention:

1. In a device of the class described a receptacle having an opening adjacent to the bottom of one side, a roller journaled horizontally therein and adapted to extend through but not fill such opening, a tank disposed within the receptacle and adapted to receive the lower portion of the roller, a second tank disposed above the roller, means disposed above the central part of the roller for permitting the contents of the second tank to drip upon said roller, a scraper disposed adjacent to the surface of the roller opposite the opening, transparent devices arranged above the scraper adapted to form an apex passage, and means for rotating the roller.

2. In a device of the class described a receptacle having an opening adjacent to the bottom of one side, a roller journaled horizontally therein and adapted to extend through but not fill such opening, a tank disposed within the receptacle and adapted to receive the lower portion of the roller, a second tank disposed above the roller, means disposed above the central part of the roller for permitting the contents of the second tank to drip upon said roller, a scraper disposed adjacent to the surface of the roller opposite the opening, transparent devices arranged above the scraper adapted to form an apex passage, one of said devices being transparent.

Des Moines, Iowa, October 23, 1914.
ERNEST E. PEARSON.
WILLIAM H. PEARSON.

Witnesses:
A. SHERMAN,
J. MAHER.